United States Patent [19]

Davidson et al.

[11] Patent Number: 4,718,108
[45] Date of Patent: Jan. 5, 1988

[54] IMPROVED MULTIPLE SITE COMMUNICATION SYSTEM

[75] Inventors: Allen L. Davidson, Crystal Lake; Steve Dunkerton, Riverwoods, both of Ill.

[73] Assignee: Motorola, Inc., Schaumburg, Ill.

[21] Appl. No.: 864,688

[22] Filed: May 19, 1986

[51] Int. Cl.$^4$ ................................................ H04B 7/26
[52] U.S. Cl. ........................................ 455/17; 379/59; 379/63; 455/20
[58] Field of Search ................... 379/63, 58, 56, 60, 379/59; 455/53, 15, 20, 33, 34, 54, 16, 22, 17

[56] References Cited

U.S. PATENT DOCUMENTS

| 3,632,891 | 1/1972 | Basini et al. | 455/17 |
| 4,012,597 | 3/1977 | Lynk, Jr. et al. | 455/53 |
| 4,152,647 | 5/1979 | Gladden et al. | 325/4 |
| 4,188,582 | 2/1980 | Cannalte et al. | 325/58 |
| 4,209,749 | 6/1981 | Becker et al. | 455/56 |
| 4,312,070 | 1/1982 | Coombes et al. | 371/40 |
| 4,578,815 | 3/1986 | Persinotti | 455/15 |

FOREIGN PATENT DOCUMENTS 8600775  1/1986  PCT Int'l Appl. ................ 379/60

Primary Examiner—Robert Lev
Attorney, Agent, or Firm—Robert J. Crawford

[57] ABSTRACT

Disclosed is a communication system of the type adapted to communicate a message substantially simultaneously between a plurality of fixed location sites having respective radio coverage areas. The system has an arrangement comprising first and second radio frequency transceiver means located at respective first and second sites. The first radio frequency transceiver means is designed for operating on a first set of frequencies. The second radio frequency transceiver means is designed for operating on a respective different set of frequencies than the first set of frequencies. The second radio frequency transceiver means has means for receiving and converting the first set of frequencies to the respective different set of frequencies.

38 Claims, 4 Drawing Figures

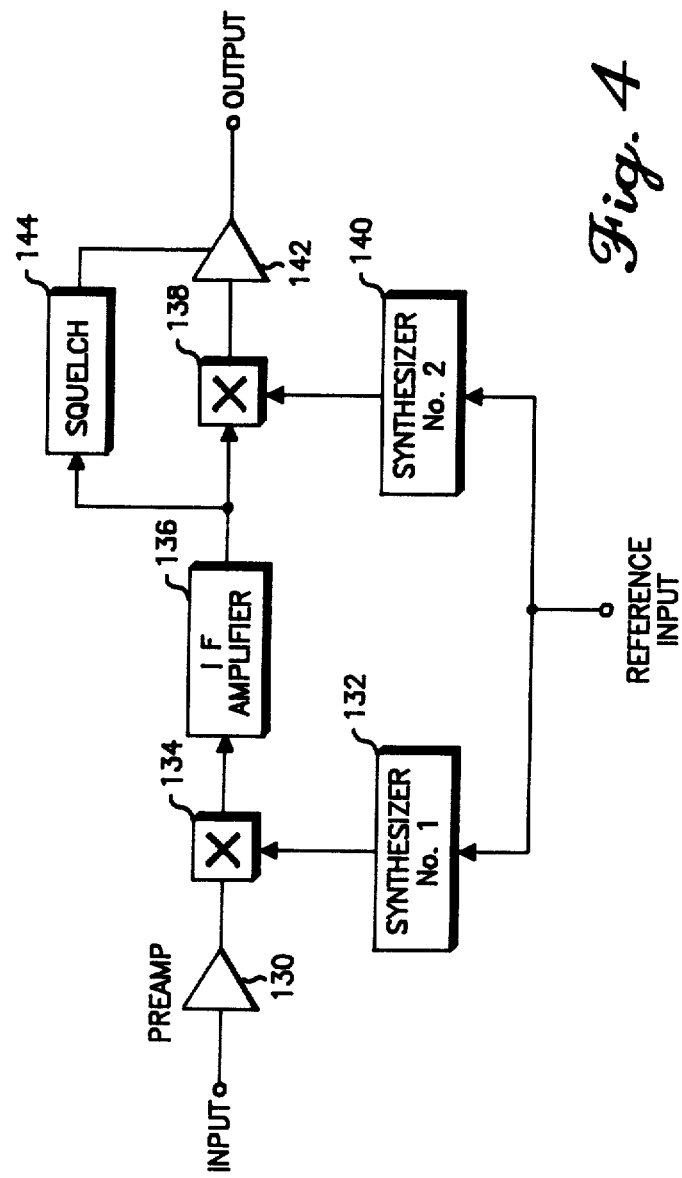

IMPROVED MULTIPLE SITE COMMUNICATION SYSTEM

FIELD OF THE INVENTION

The present invention relates to radio communication systems and, more particularly, to radio communication systems which transmit substantially simultaneously at multiple sites.

BACKGROUND OF THE INVENTION

Radio communication over large or wide geographical areas has posed significant problems in the past. Systems of this type generally must make communication possible between mobile or portable equipment which have low power transmitters and which can move in any direction within the wide area coverage. There are several types of fixed system configurations which have been used to make such communication possible. One general type of system includes a centralized fixed-site receiver, a high power transmitter and a plurality of remotely located receivers connected by wireline or microwave back to the central site. Another type includes mobile repeaters which rebroadcast the radio communications, and a third type of system simultaneously transmits the radio communication or message from multiple fixed sites on the same frequency. Systems of this last type have often been referred to as "simulcast" systems.

Although many kinds of these systems have been successfully implemented to cover substantially wide geographical areas, none of these approaches are handily designed to cover inaccessible areas, or frequency blocked areas. These areas include subterraneous locations such as subways and sub-basements. Systems employing high power tranmitters or mobile repeaters cannot overcome the frequency blocking problem since reception of the frequency is inhibited. Simulcast systems, however, have enjoyed some success in overcoming this problem.

Simulcast systems generally include a plurality of radio transmission and reception fixed sites, spaced apart throughout the geographical area to be provided with radio communication coverage. Ideally, the fixed sites are distributed such that areas not covered by one site will be covered by another site. The sites are consequently distributed to create an overlapping patchwork of individual radio coverage areas which, taken together, approximates the desired geographical coverage area. The message to be transmitted from each site is conveyed from one site to each of the other sites by microwave or wireline and subsequently transmitted by all of the sites on the same frequency to be received by all of the mobiles and other portables within the wide coverage area.

Employing a simulcast system to include coverage for otherwise inaccessible areas is impractical since it generally entails installation of one or more additional radio transmission and reception fixed sites within the inaccessible area.

Notwithstanding the burdensome cost of the additionally installed microwave communication equipment, a number of problems are encountered with simulcast systems. One problem pertains to overlapping coverage areas necessary in simulcast systems to assure complete coverage by the transmitters. Because the transmitters operate on the same frequency, beat note interference and demodulated audio phase cancellation can result in the overlapping areas. Correction of these problems is expensive. Although it is not necessary to implement multiple transmitters within the inaccessible area, this problem remains inherent to the system if the system is to provide normal wide area coverage. The present invention avoids these problems by utilizing a novel technique operative within a trunked access system.

Trunked access radio systems are well known. In such systems, a fixed number of duplex radio channels is shared amoung a large number of potential users. Through a central controller, the system allocates the radio channels to the mobile users depending upon their communication need and deallocates the radio channel upon completion of a user's transmission. Communication between users and the central controller occurs on a designated link which can be a separate duplex control channel or some form of subaudible, audible, supra-audible or subcarrier shared radio channel communication.

OBJECTS AND SUMMARY OF THE INVENTION

Accordingly, it is a general object of the present invention to provide a new and improved wide area coverage radio communication system.

It is a further object of the present invention to provide a multiple site communication system to permit radio communication to otherwise inaccessible coverage areas.

It is a further object of the present invention to provide such a communication system which can be implemented within a trunked access system.

One particular embodiment of the present invention comprises a communication system of the type adapted to relay a message substantially simultaneously between a plurality of fixed location sites having respective radio coverage areas. The system has an arrangement comprising first and second radio frequency transmission means located at respective first and second sites. The first radio frequency transmission means is designed for transmitting on a first set of frequencies. The second radio frequency transmission means is designed for transmitting on a respective different set of frequencies than the first set of frequencies. The second radiio frquency transmission means has means for receiving and converting the first set of frequencies to the respective different set of frequencies.

It is preferred that the second radio frequency transmission means has an antenna coupled thereto, but located with the coverage area of the first site. Further, it is preferred that the first site transmits control information separately for each respective site. Hence, control information transmitted from the first site is received at the second site through the antenna, the information is converted to one of the respective differentset of frequencies and retransmitted for units located within the coverage area of the second site. Accordingly, in a wide area communication system, normallly inaccessible areas may be reached by locating communication equipment therein, as described above, for the second site.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 4 is a block diagram of one of the repeaters indentified as either a transmit/receive or a receive/transmit repeater in FIG. 3 depicted in accordance with the present invention.

DETAILED DESCRIPTION OF THE PREFERRED EMBODIMENTS

Figure 1:
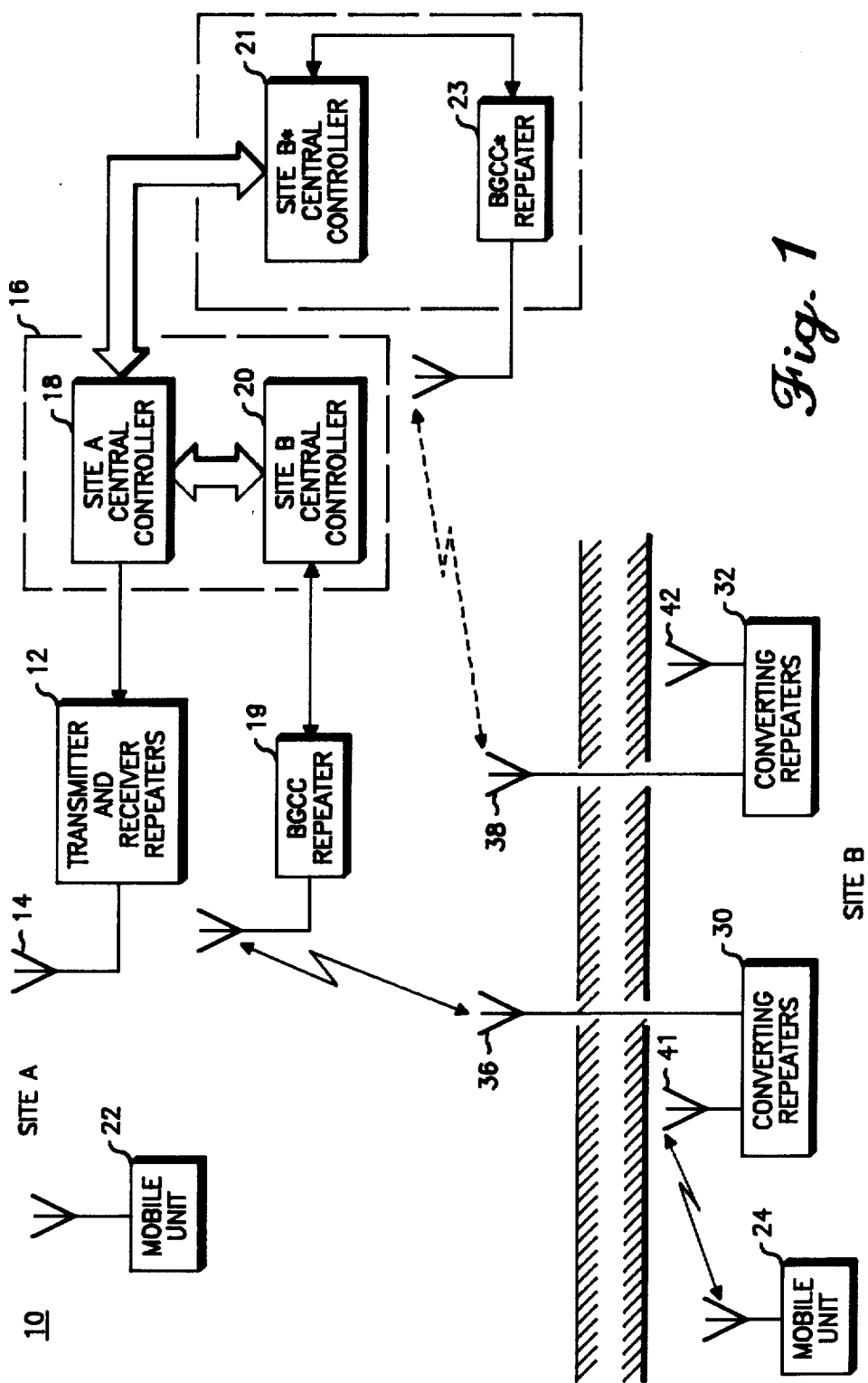
FIG. 1 is a schematic representation of a multisite communication system depicted in accordance with the present invention.

Referring to FIG. 1, illustrated in schematic form is an improved multisite communication system 10 for communication between units, such as mobiles, portables, etc. The system includes two fixed transmitting and receiving sites designated as sites A and B. Site A is designated to handle general above ground communication, while site B is intended to handle an otherwise inaccessable area, such as an underground location. One skilled in the art can appreciate that the system can be expanded to cover substantially wider areas of coverage. One example of such anexpansion is described in U.S. Pat. No. 4,578,815, assigned to the assignee of the present invention.

Fixed site A includes radio frequency transmitting and receiving means in the form of general transmitter and receiver repeaters 12 for site A communication, including one or more fixed antennas (14). Fixed site B includes one or more radio frequency transmitting and receiving means in the form of converting repeaters 30, and 32 for site B communication. The transmitter and receiver repeaters 12 for site A are arranged for transmitting and receiving on a respective different group of frequencies than those of site B, with each repeater being assigned a predetermined duplex channel (2 frequencies per channel). Site A additionally includes one duplex data channel repeater (contained within block 12) for site A communication control, referred to as the above ground control channel (AGCC) repeater, and another duplex data channel repeater 19 for site B communication control, referred to as the below ground control channel (BGCC) repeater.

The control channel information is provided by a central controller 16 which also handles the complete communication operation for sites A and B. Such operation includes monitoring for channel request, assigning channels, recording channel usage, etc. One manner of implementing the central controller 16 is to split its functions for each site. Accordingly, a site A central controller 18 and a site B central controller 20 are shown representing central site controller 16. Each central controller 18 and 20 is designated to handle only the central controller functions for its respective site. Specifically, site A central controller 18 generates signalling channel information through one of the transmitter and receiver repeaters 12 using AGCC to mobile units (22) which are located above ground. Site B central controller 20 generates signalling channel information using BGCC through BGCC repeater 19 to those mobile units (24) located at site B.

As shown, site B is in a subterranean environment, which would typically prevent mobiles located therein from communicating with equipment located within site A. However, converting repeaters 30 and 32 are used to translate communications between sites A and B via the above ground antennas 36 and 38 coupled to the converting repeaters. Antennas 41 and 42 are used to communicate information between units (24) located with the site B coverage area and the respective converting repeaters 30 and 32. None of the mobiles using the system are programmed to receive or transmit on BGCC. Hence, any mobile located above ground, i.e. within site A, may directly monitor AGCC, while any mobile located within site B, may communicate over BGGG through one of the converting repeaters 30 or 32 translating the communication to a directly monitorable site B channel.

The two converting repeaters 30 and 32 of site B may operate on the same set of frequencies. When a communication is transmitted from site A, other than over AGCC, it is received through the above ground antennas 36 and 38 and converted to a channel which can be received by mobiles in site B. Although only two sets of converting repeaters are shown, it should be understood that a greater or lesser number of converting repeaters may be necessary depending upon the particular application. Further, when using multiple converting repeaters operating on the same frequencies, overlap coverage between the repeaters can avoid the simulcast problems of beat note interference and demodulated audio phase cancellation by using rubidium standard reference oscillators at each set of repeaters 30 and 32.

The above ground antennas 36 and 38 along with the respective repeaters 30 and 32 communicate with site A voice channels and BGCC. Site B is not implemented to communicate on AGCC. The repeaters 30 and 32 are designed to convert those channels operative on site A, but not AGCC, to a unique set of corresponding channels useful for site B. For example, when site A transmits its BGCC frequency, the repeaters 30 and 32 convert that frequency to a "converted-BGCC" (C-BGCC) before repeating that communication to mobile units 24 in site B. Likewise, those channels used for site A voice communications are converted to corresponding below ground voice channels before being repeated to mobile units (24) in site B.

The following table illustrates an example of channel allocation at each site.

SITE A: AGCC (CH1 CH2 CH3 CH4), BGCC
SITE B: — (CH11 CH12 CH13 CH14), C-BGCC;

where CH1 thru CH4 are used for voice communication in site A, and CH11 thru Ch14 are used for voice communication in site B. AGCC is used for control information within site A, and BGCC is used for control information within site B. BGCC corresponds to a convered C-BGCC and CH1 corresponds to a converted CH11, CH2 corresponds to a converted CH12, etc.

Before the rest of the system is described in greater detail, it may be helpful to follow the progression of a call made at each site. Each mobile unit has a storage device which, among other information, contains its own individual identity, a grouping and subgrouping of other units to which the user can selectively communicate, and a listing of control channels which are in use at each site of the system. For a more detailed description of such a device, reference may be made to U.S. Pat. Nos. 4,012,597 or 4,312,070 which are assigned to the assignee of the present invention. The mobile units further include equipment which cause its receiver to scan the outbound or fixed site transmit frequencies associated with the control channels until a suitably error free data signal is received. The mobile unit stops searching and remains on this control channel outbound frequency until commanded to tune to another frequency or until the data signal degrades to an unusable level, at which time the control channel scanning resumes.

All mobile equipment not engaged in an active call remains tuned to the control channel of the site in the coverage area where it is located. For example, when mobile unit 22 is not engaged in an active call it remains tuned to AGCC. When a call is requested by a mobile unit, a request for service is initiated by the user activating the mobile transmitter, the mobile transmitter transmits a request to the central controller via its corresponding control channel. This request contains the identity mobile equipment and group of mobile equipment being called. It also contains the type of service required. For example, mobile unit 22 may request communication with only a particular group of mobile units located in site A.

Assuming mobile unit 22 of site A initiates a request for service, the request is received by the transmitter and receiver repeaters 12 and passes to site A central controller 18 for interpretation. Site A central controller 18 monitors the activity of all the system channels available and directs those mobiles in the group requested by mobile unit 22 to an available channel. Those mobile units monitoring AGCC and within the group being requested receive this assignment and configure their respective receivers to monitor the assigned voice chanel for reception.

Communication for mobile units within the site B coverage area is more complex. Assuming that mobile unit 24 initiates a request for service, the request is transmitted over converted-BGCC. The repeaters convert the converted-BGCC back to the normal BGCC and repeat this information through one or more of the above ground antennas 36 and 38 to BGCC repeater 19. This information is passed to site B central controller 20 for interpretation. Site B central controller 20 determines an available voice channel and both central controllers 18 and 20 assign a voice channel using their respective control channel repeaters. If mobile unit 22 is in the group requested by mobile unit 24, mobile unit 22 configures itself to monitor the assigned voice channel via AGCC. BGCC is translated by converting repeaters 30 and 32 to the converted-BGCC for communication of this channel assignment in site B. Receiving this converted-BGCC information, mobile unit 24 configures itself to communicate on the converted voice channel corresponding to the assigned voice channel of site A. Further communication proceeds with mobile unit 24 conversing with other designated mobile units in site B via the converted voice channel corresponding to the assigned voice chanel of site A, and to mobile units of site A through the conversion/retransmission of the channel through converting repeaters 30 and 32.

When a mobile unit travels from within one site coverage area to the other during a conversion, the conversion will momentarily be lost by that mobile unit. The mobile unit will search for a control channel for the site and the control channel will instruct it to the appropriate voice channel to recapture the conversation. For example, if mobile unit 24 of site B is communicating over a below ground, or converted, voice channel and travels above ground within coverage of site A, conversation will be momentarily lost. However, the mobile unit quickly begins scanning for a control channel. Since there are no mobile units programmed to receive an unconverted BGCC, mobile unit 24 quickly locks onto AGCC which instructs it to configure itself for the appropriate voice channel to continue conversation.

A first alternative embodiment to the arrangement discussed above includes additional transmitter and receiver repeaters 12 used exclusively for site A communication. If a mobile, communicating on one of these exclusive site A repeaters, relocates within site B during communication, once the mobile reestablishes the new control channel, the central controller 16 switches all mobiles participating in the communication to one of the nonexclusive channels, i.e., CH1, CH2, CH3 or CH4, thereby allowing communication above and below ground as in the previous embodiment.

The following table illustrates the channel allocation at each site for this type of configuration.

SITE A: AGCC (CH1 CH2 CH3 CH4), BGCC (CH5-CH10)
SITE B: — (CH11 CH12 CH13 CH14), C-BGCC;

where CH5-CH10 depict the channels used exclusively for communication on site A. The remaining channels shown are used as described in the previous embodiment.

This type of configuration would be desirable in situations where above ground units do not typically communicate with below ground units, and/or the number of above ground units demands more channel allocation.

A second alternative embodiment includes an additional site B central controller 21 and an additional repeater 23. They are referred to as site B* central controller and BGCC* repeater, respectively. BGCC* is an independent control channel exclusively handled by the site B* central controller. In this embodiment, control channel communication at site B is split. Site B central controller 20, with BGCC repeater 19, communicates control channel information over antenna 36 to the converting repeaters 31, while site B* central controller 21, with BGCC* repeater 19, communicates control channel information over antenna 38 to the converting repeaters 32.

The voice channels operative within site B are also split. Voice channels associated with converting repeaters 30 are distinct from voice channels associated with converting repeaters 32. Thus, a mobile unit 24 located with site B, but nearer converting repeaters 32 than converting repeaters 30, locks onto a converted BGCC* control channel. Conversely, a mobile unit 24 located with site B, but nearer converting repeaters 30 than converting repeaters 32, locks onto a converted BGCC control channel. Transmission of information from site A to site B is still maintained by translating site A voice channels to site B1 (corresponding to the coverage area of converting repeaters 30), and site B2 (corresponding to the coverage area of converting repeaters 32) voice channels, respectively. Communication between mobile units within site B1 and site B2 requires a communication path which first traverses the site A coverage area, i.e., repeated above ground to the other converting repeater.

The following table illustrates the channel allocation at each site for this type of configuration.

---
SITE A: AGCC (CH1 CH2 CH3 CH4), BGCC, BGCC*
SITE B1: — (CH11 CH12 CH13 CH14), C-BGCC;
SITE B2: — (CH111 CH112 CH113 CH114), C-BGCC*;
--- where CH111–CH114 depict the voice channels for site B2 corresponding to CH1–CH4, respectively, and C-BGCC* corresponds to the a converted BGCC* for use by mobile units within site B2. The remaining channels shown are used as described in the previous embodiment.

Although this configuration may appear expensive in light of the additional equipment, since the converting repeaters transmit on different frequencies this arrangement avoids the rubbidium standard equipment required when similcasting within site B, as in the previous embodiments. Also, in implementations which require significantly larger site B coverage areas, such as in a very long tunnel, alternating sets of converting repeaters may be used with each other set using the same set of communication channels. Hence, regardless of the number of sets of converting repeaters, only two control channels are required for the entire site B coverage area.

Figure 2:
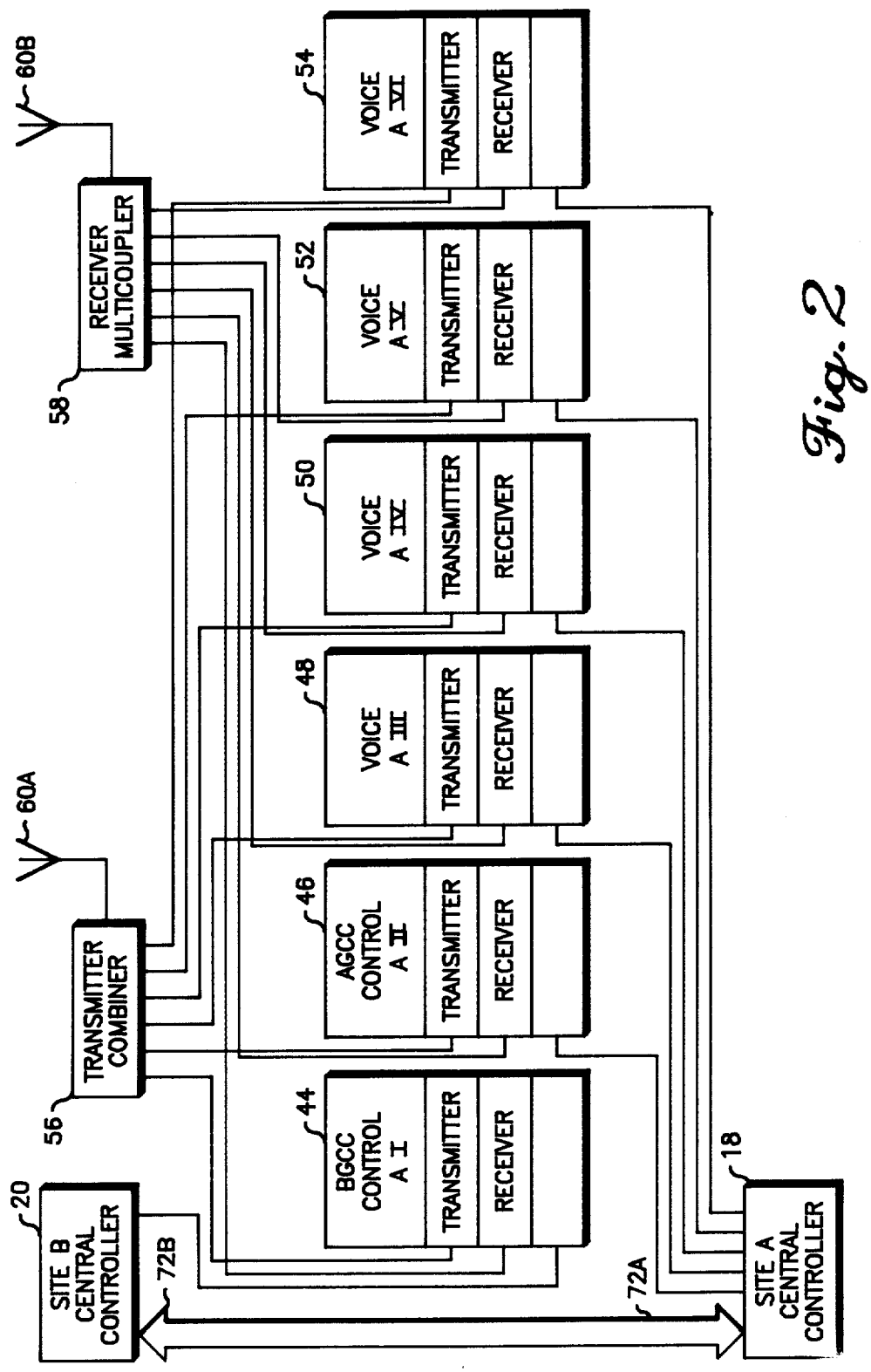
FIG. 2 is a block diagram of the fixed site indentified as site A in FIG. 1 and which embodies one aspect of the present invention.

Referring now to FIG. 2, illustrated in greater detail is the equipment from the original embodiment at site A. Assuming a 5 channel system, site A includes six repeaters 44, 46, 48, 50, 52 and 54 which comprise the transmitter and receiver repeaters 12 illustrated in FIG. 1. Associated with the repe4aters is a transmitter combiner 56, such as a Cellwave TJD 800-10T, and a receiver multicoupler 58, such as a Cellwave RMC 800-8N. The transmitter combiner is coupled to a transmitting antenna 60a and the receiver multicoupler is coupled to a receiving antenna 60b. Four of the repeaters, repeaters 48, 50, 52 and 54, comprise message channel repeaters which are trunked for providing voice communication to the mobile units. Site A further includes its respective central controller 18, such as a T1958 manufactured by Motorola, Inc., which controls the operation of the fixed radio equipment, such as the repeaters, and communicates whith the mobile unit logic systems by the site's radio control channel repeater 46. Site A further includes the site B central controller, for which a Motorola T1958 may also be used, which communicates with the mobile unit logic systems in site B. Control information is provided to units within site B via the BGCC repeater 44. Data communication between each central controller is provided by an RS232 port 72a and 72b, respectively, available at each central controller.

Each of the repeaters 44, 46, 48, 50, 52 and 54 includes a transmitter which is oupled to t he transmitter combiner 56, and a receiver which is coupled to the receiver multicoupler 58. As indicated, the repeaters are arranged for operating on six different channels. Each channel is indicated with a Roman numeral. Hence, the site A transmitting equipment is arranged for transmitting/receiving on channels AI through AVI.

Figure 3:
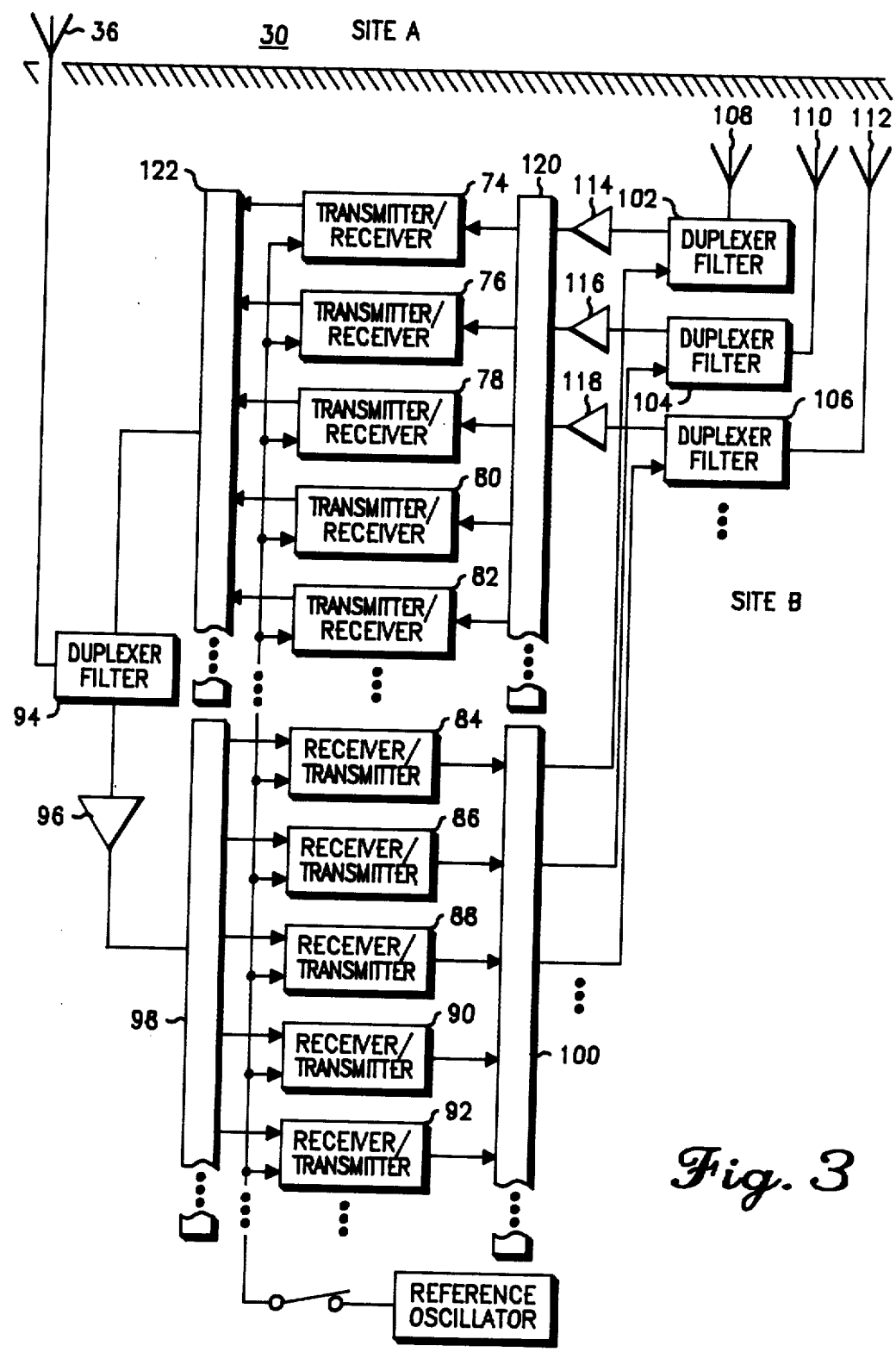
FIG. 3 is a block diagram of the fixed site indentified as site B in FIG. 1 and which embodies another aspect of the present invention.

Referring now to FIG. 3, illustrated in greater detail is one of the converting repeaters 30 or 32 at site B from FIG. 1. Although such arrangements could be duplicated for specific coverage areas, this single arrangement is intended to suffice in describing the essential requirements for one coverage area. Assuming four operative voice channels as in FIG. 2, the embodiment in FIG. 3 includes two types of repeaters, transmit/receive (t/r) and receive/transmit (r/t). The r/t repeaters 84, 86, 88, 90 and 92 are used to receive the frequencies transmitted from above ground, convert those frequencies to the corresponding below ground frequencies, and repeat the received transmissions below ground. The above ground transmissions are received by the above ground antenna 36, passed through a duplexer/filter 94, a preamp 96, and finally through a multicoupler 98 before being operated upon by the r/t repeaters 84, 86, 88, 90 and 92. Once the r/t repeaters 84, 86, 88, 90 and 92 convert the frequencies, the converted signals are passed through a multicoupler 100, and coupled to a dupleser/filter 102, 104 or 106 before being transmitted over its corresponding underground antenna 108, 110 or 112 to site B.

The t/r repeaters 74, 76, 78, 80 and 82, such as a Motorola model C74CLB7105AT, are used to receive the frequencies transmitted from mobiles below ground, convert those frequencies to the coresponding above ground frequencies, and repeat the received transmissions above ground. The below ground transmissions are received by the below ground antennas 108, 110 and 112, passed through the corresponding duplexer/filter 102, 104 or 106, a preamp 114, 116 or 118, and finally through a multicoupler 120 before being operated upon by the t/r repeaters 74, 76, 78, 80 and 82. The multicoupler 120 may be constructed with transmission line 3dB quadrature couplers. Once the t/r repeaters 74, 76, 78, 80 and 82 convert the frequencies, the converted signals are passed through a combiner 122 to interface to the single input port of duplexer/filter 94. The converted signal is then passed through to the above ground antenna 36 for transmission to the site A equipment.

One skilled in the art coan appreciate that the above multicouplers, preamps, combiners and duplexer/filters are elements specific to the system and their designs depend upon such factors as power, frequency, bandwidth specificiations etc. For detailed information, reference may be made to Merimac Cat. no. M126, Products Cat no. 20A and Cellwave Cat. no. 985.

Referring now to FIG. 4, illustrated in detail is an embodiment of the t/r repeater and the r/t repeater of FIG. 3, which may be used to avoid implementation of rubidium standard reference oscillators at each repeater in site B. Regardless of whether the input frequency is being converted up or down, the embodiment of FIG. 4 entails similar circuitry. The signal input to the repeater is passed through a preamp 130 before being mixed by a mixer 134 with a signal output from synthesizer 132 at an appropriate intermediate frequency (IF). The IF amplifier 136 provides appropriate amplification to the mixer output signal for a second mixing stage. Synthesizer 132 is programmed by the reference input such that the difference signal output from mixer 134 is an appropriate IF useful for a second mixing operation by mixer 138 to mix-up the signal output from IF amplifier 136. Following mixer 138 is a power amplifier (P.A.) 142 used to amplify the signal before it is output to the appropriate duplexer/mixer of FIG. 3. The squelch circuit 144 is set to detect an amplification level output from the IF amplifier 136, in which case the squelch circuit enables the P.A. to output the converted signal.

The following example may be helpful to illustrate why the rubidium standard is not necessary with this repeater implementation in site B. Consider an example of a typical repeater embodiment where the receiver receives an 800MHz signal, mixes the signal to the audio spectrum, and a transmitter mixes the signal from the audio spectrum back up to a nominal 801MHz signal. Further, consider a reference oscillator at the transmitter operating with 1 ppm accuracy. Worst case, the error incurred at the output of the transmitter is 801 HZ, i.e., the transmitter is transmitting at 801.000801 MHz.

Using the embodiment of FIG. 4, consider the repeater with the same nominal input and output, and with internal parameters as follows:

f1 = input freq. to preamp 130
$f_{LO1}$ = nominal LO freq. output from syn. 1 (132)
d1 = error in LO freq. output from syn. 1 (132)
$f_{LO2}$ = nominal LO freq. output from syn. 2 (140)
d2 = error in LO freq. output from syn. 2 (140)
f2 = output freq. from P.A. 142, and
$f_{IF}$ = frequency through I.F. amplifier 136.

Using the above parameters, and assuming $F_{IF}$ = 10 MHz nominal, the output of mixer 134 is $$f_{IF} = f1 - (f_{LO1} + d1),$$

and the output of mixer 138 is:

$$f2 + f1 - (f_{LO1} + d1) + (f_{LO2} + d2),$$

or rather $$f2 = f1 - f_{LO1} + f_{LO2} + (d2 - d1),$$

where d2–d1 is the error. Further, since $f_{LO1}$ must equal 790 MHz and $f_{LO2}$ must equal 791 MHz for a nominal output of 801 MHz, it can be deduced that d1=790 Hz and d2=791 Hz. Accordingly, the error at the output is 1 Hz, while the typical repeater embodiment, as described above, realizes an error of 801 Hz. This 801:1 improvement results from the errors in the two L.O. frequencies subtracting at the output, and will adequately suffice in avoiding the simulcast overlap problems previously discussed.

The present invention therefore provides a new and improved system and method for multiple site radio communication which can practically accomodate what would otherwise be inaccessible areas of coverage. Because the repeaters located within the inaccessible area are transmitting on a respective different set of frequencies, mobiles can be assured of stron reception on one set of grequencies without interference between the typically inaccessible site and the other transmitting site. An additional benefit of the above arrangement is that additional communication equipment, such as microwave equipment, between the multiple sites is not neccessary. Further, because access of the system is controlled by a centralized controller in a trunking manner, equal access of the system is provided to many potential users.

While the invention has been particularly shown and described with reference to a preferred embodiment, it will be understood by those skilled in the art that various other modifications and changes may be made to the present invention described above without departing from the spirit and scope thereof.

What is claimed is:

1. In a communication system of the type adapted to communicate a message substantially simultaneously between a plurality of fixed location sites having respective radio coverage areas, an arrangement for providing communication to units within said coverage areas comprising:
   first radio frequency transmission means at a first one of said sites for transmitting to units on selected ones of a first set of frequencies;
   second radio frequency transmission means at a second one of said sites for transmitting on selected ones of a second set of frequencies different than said first set of frequencies, said second radio frequency transmission means having means for receiving selected ones of said first set of frequencies and means for converting selected ones of said first set of frequencies to ones of said second set of frequencies; and
   control means at said first site and coupled to said first radio frequency transmission means for selecting among said first and second set of frequencies to communicate on channels at said first and second sites whereby said message may be substantially simultaneously communicated at said respective sites.

2. The arrangement for providing communication, in accordance with claim 1, further including reception means at said first site, coupled to said tramsmission means at said first site, and reception means at said second site, coupled to said transmission means at said second site, whereby said reception means at said second site receives a message from units within said second site and retransmits said message to said first site, received at said first site using said reception means at said first site, for retransmission at said first site using said transmission means at said first site.

3. The arrangement for providing communication, in accordance with claim 1, wherein said control means further includes a plurality of individual control means, each dedicated to a respective site.

4. The arrangement for providing communication, in accordance with claim 1, wherein said first site further includes means for generating control information which may designate and assign units monitoring said control information to a selected one of said frequencies.

5. The arrangement for providing communication, in accordance with claim 1, wherein said second site further includes a plurality of radio repeaters each simultaneously receiving and converting between ones of said first set of frequencies and ones of said respective different set of frequencies.

6. The arrangement for providing communication, in accordance with claim 5, wherein each said repeater further includes a substantially stable reference oscillator coupled thereto.

7. The arrangement for providing communication, in accordance with claim 1, wherein said second radio frequency transmission means further includes single reference frequency mixing means for converting selected ones of said first set of frequencies to ones of said respective different set of frequencies.

8. The arrangement for providing communication, in accordance with claim 1, wherein said second radio frequency transmission means further includes an antenna coupled thereto and located within said coverage area of said first site.

9. The arrangement for providing communication, in accordance with claim 1, further including means for transmitting control information on separate channels, one for each respective site.

10. The arrangement for providing communication, in accordance with claim 1, wherein said first site is substantially above ground and said second site is substantially below ground.

11. In a communicaiton system of the type adapted to communicate a message substantially simultaneously between a plurality of fixed location sites having respective radio coverage areas, an arrangement for providing communication to units within said coverage areas comprising:
   first radio frequency transmission means at a first one of said sites for transmitting, on separate frequencies, dedicated channel control information to respective sites, and for transmitting voice information to units within at least its site, on selected ones of a set of frequencies;
   second radio frequency transmission means at a second one of said sites for retransmitting said voice information to units located within its respective site according to said channel control information transmitted form said first radio frequency transmission means, said second site further including a plurality of radio repeaters for receiving and converting between ones of said set of frequencies and ones of a second set of frequencies different than said first set of frequencies, said second set of frequencies for said coverage area of said second site; and
   control means at said first site and coupled to said first radio frequency transmission means for selecting amoun said selected frequencies to communicate on channels at said first and second sites whereby said message may be communicated substantially simultaneously at said respective sites.

12. The arrangement for providing communication, in accordance with claim 11, further including reception means at said first site, coupled to said transmission means at said first site, and reception means at said second site, coupled to said transmission means at said site receives a message from units within said second site and retransmits said message to said first site, received at said first site using said reception means at said first site, for retransmission at said first site using said transmission means at said first site.

13. The arrangement for providing communication, in accordance with claim 11, wherein said control means further includes a plurality of individual control means, each dedicated to a respective site.

14. The arrangement for providing communication, in accordance with claim 11, wherein said first site further includes means for generating control information which may designate and assign units monitoring said control information to a selected one of said frequencies.

15. The arrangement for providing communication, in accordance with claim 11, wherein each said repeater further includes a substantially stable reference oscillator coupled thereto.

16. The arrangement for providing communication, in accordance with claim 11, wherein said second radio frequency transmission means further includes single reference frequency mixing means for converting between selected ones of said first set of frequencies and ones of said respective different set of frequencies.

17. The arrangement for providing communication, in accordance with claim 11, wherein said second radio frequency transmission means further includes an antenna coupled thereto and located within said coverage area of said first site.

18. The arrangement for providing communication, in accordance with claim 11, further including third radio frequency transmission means at a third one of said sites for retransmitting said voice information to units located within its respective site according to said channel control information transmitted from said first radio frequency transmission means.

19. The arrangement for providing communication, in accordance with claim 11, wherein said first site is substantially above ground and said second site is substantially below ground.

20. In a communication system of the type adapted to communicate a message substantially simultaneously between a plurality of fixed location sites having respective radio coverage areas, an arrangement for providing communication from units within said coverage areas comprising:
   first radio frequency transmission means, and reception means at a first one of said sites for receiving from units on selected ones of a first set of frequencies;
   second radio frequency transmission and reception means at a second one of said sites for receiving transmission from units on selected ones of a second set of frequencies different than said first set of frequencies, said second radio frequency transmission means having means for converting said second set of frequencies to said first set of frequencies; and
   control means at said first site and coupled to said first radio frequency transmission means for selecting among said first and second set of frequencies to communicate on channels at said first and second sites whereby said message may be substantially simultaneously communicated at said respective sites.

21. The arrangement for providing communication, in accordance with claim 20, wherein said transmission means at said second site has means for retransmitting to units at said first site.

22. The arrangement for providing communication, in accordance with claim 20, wherein said control means further includes a plurality of individual control means, each dedicated to a respective site.

23. The arrangement for providing communication, in accordance with claim 20, wherein said first site further includes means for generating control information which may designate and assign units monitoring said control information to a selected one of said frequencies.

24. The arrangement for providing communication, in accordance with claim 20, wherein said second site further includes a plurality of raqdio repeaters each simultaneously receiving and converting between ones of said first set of frequencies and ones of said respective different set of frequencies.

25. The arrangement for providing communication, in accordance with claim 23, wherein each said repeater further includes a substantially stable reference oscillator coupled thereto.

26. The arrangement for providing communication, in accordance with claim 20, wherein said second radio frequency transmission means further includes single reference frequency mixing means for converting selected ones of said first set of frequencies to ones of said respective different set of frequencies.

27. The arrangement for providing communication, in accordance with claim 20, wherein said second radio frequency transmission means further includes an antenna coupled thereto and located within said coverage area of said first site.

28. The arrangement for providing communication, in accordance with claim 20, further including means for transmitting control information on separate channels, one for each respective site.

29. The arrangement for providing communication, in accordance with claim 20, wherein said first site is substantially above ground and said second site is substantially below ground.

30. In a communication system of the type adapted to communicate a message substantially simultaneously between a plurality of fixed location sites having respective radio coverage areas, an arrangement for providing communication from units within said coverage areas comprising:
  first radio frequency transmission means and reception means at a first one of said sites for transmitting, on separate frequencies, dedicated channel control information to respective sites, and for receiving voice information from units within at least its site, on selected ones of a set of frequencies;
  second radio frequency reception means and transmission means at a second one of said sites for retransmitting voice information from units located within its respective site using said channel control information transmitted from said first radio frequency transmission means, said second site further including a plurality of radio repeaters for receiving and converting between ones of said set of frequencies and ones of a second set of frequencies different from said first set of frequencies, said second set of frequencies for said coverage area of said second site; and
  control means at said first site and coupled to said first radio frequency transmission means for selecting among said selected frequencies to communicate on channels at said first and second sites whereby said message may be communicated substantially simultaneously at said respective sites.

31. The arrangement for providing communication, in accordance whtin claim 30, wherein said transmission means at said second site further includes transmission means for transmitting within said first site.

32. The arrangement for providing communication, in accordance with claim 30, wherein said control means further includes a plurality of individual control means, each dedicated to a respective site.

33. The arrangement for providing communication, in accordance with claim 30, wherein said first site further includes means for generating control information which may designate and assign units monitoring said control information to a selected one of said frequencies.

34. The arrangement for providing communication, in accordance with claim 30, wherein each said repeater further includes a substantially stable reference oscillator coupled thereto.

35. The arrangement for providing communication, in accordance with claim 30, wherein said second radio frequency transmission means further includes single reference frequency mixing means for converting between selected ones of said first set of frequencies and ones of said respective different set of frequencies.

36. The arrangement for providing communication, in accordance with claim 30, wherein said second radio frequency transmission means further includes an antenna coupled thereto and located within said coverage area of said first site.

37. The arrangement for providing communication, in accordance with claim 30, further including third radio frequency transmission means at a third one of said sites for retransmitting said voice information to units located within its respective site according to said channel control information transmitted from said first radio frequency transmission means.

38. The arrangement for providing communication, in accordance with claim 30, wherein said first site is substantially above ground and said second site is substantially below ground.

* * * * *

UNITED STATES PATENT AND TRADEMARK OFFICE
CERTIFICATE OF CORRECTION

PATENT NO. : 4,718,108
DATED : January 5, 1988
INVENTOR(S) : Allen L. Davidson and Steve Dunkerton It is certified that error appears in the above-identified patent and that said Letters Patent is hereby corrected as shown below:

Column 10, line 28, change the word "tramsmission" to --transmission--.

Column 11, line 35, change the word "amoun" to -- among --.

Column 11, line 44, before the word "site" insert --second--; after the word "site" insert --, whereby said reception means at said second site--.

Column 12, line 58, change the word "raqdio" to --radio--.

Column 14, line 4, change the word "whtin" to -- with --.

Signed and Sealed this

Twenty-first Day of June, 1988

Attest:

DONALD J. QUIGG

Attesting Officer      Commissioner of Patents and Trademarks